United States Patent [19]
Wood et al.

[11] Patent Number: 5,754,159
[45] Date of Patent: May 19, 1998

[54] INTEGRATED LIQUID CRYSTAL DISPLAY AND BACKLIGHT SYSTEM FOR AN ELECTRONIC APPARATUS

[75] Inventors: Anthony B. Wood, Dallas; Jeffrey E. Faris, Richardson, both of Tex.

[73] Assignee: Texas Instruments Incorporated, Dallas, Tex.

[21] Appl. No.: 560,188

[22] Filed: Nov. 20, 1995

[51] Int. Cl.$^6$ .................... G09G 3/28; H01J 17/00
[52] U.S. Cl. .................. 345/102; 313/514; 349/62; 345/65
[58] Field of Search .............. 345/65, 102; 313/514, 313/496, 485; 349/112, 160, 62; 445/24, 25

[56] References Cited

U.S. PATENT DOCUMENTS

| | | | |
|---|---|---|---|
| 4,945,281 | 7/1990 | Ipson | 315/58 |
| 5,128,783 | 7/1992 | Abileah et al. | 349/162 |
| 5,161,041 | 11/1992 | Abileah et al. | 349/62 |
| 5,233,262 | 8/1993 | Lynn et al. | 313/113 |
| 5,402,143 | 3/1995 | Ge et al. | 345/102 |
| 5,461,397 | 10/1995 | Zhang et al. | 345/102 |
| 5,469,021 | 11/1995 | Lepselter | 313/582 |
| 5,479,071 | 12/1995 | Lynn | 313/514 |
| 5,495,143 | 2/1996 | Lengyel et al. | 313/574 |
| 5,504,387 | 4/1996 | Hamagishi et al. | 313/310 |

*Primary Examiner*—Raymond J. Bayerl
*Assistant Examiner*—Seth D. Vail
*Attorney, Agent, or Firm*—Ronald O. Neerings; James C. Kesterson; Richard Donaldson

[57] ABSTRACT

An integrated liquid crystal display and backlight system for generating video images for a portable computer (12) comprising a top glass (32), a bottom glass (34) and a thin film transistor and liquid crystal layer (36) disposed therebetween, a diffuser (38) bonded to the bottom glass (34) on the side opposite the top glass (32), a substrate (40) bonded to the diffuser (38) opposite the bottom glass (34) having an array of semispherical cavities (42) each having an aluminized surface (44), a phosphor layer (46) coating the aluminized surfaces (44), an array of indium tin oxide conductors (48) electrically connected to the aluminized surfaces (44) and disposed within the cavities (42), and a volume of mercury gas (50) filling the cavities (42) such that when a voltage (54) is established between the aluminized surfaces (44) and the indium tin oxide conductors (48), the phosphor (46) becomes excited and produces backlight for the liquid crystal display system (26).

29 Claims, 4 Drawing Sheets

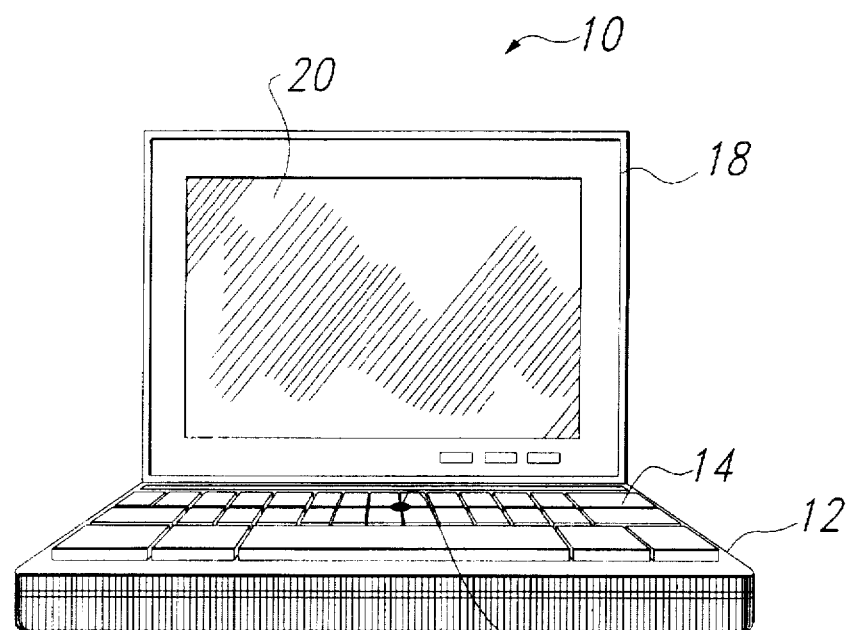
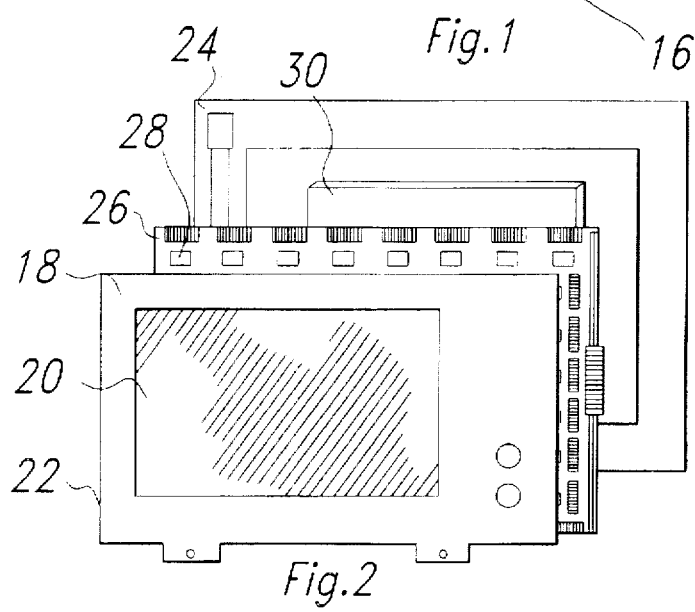
Fig.2
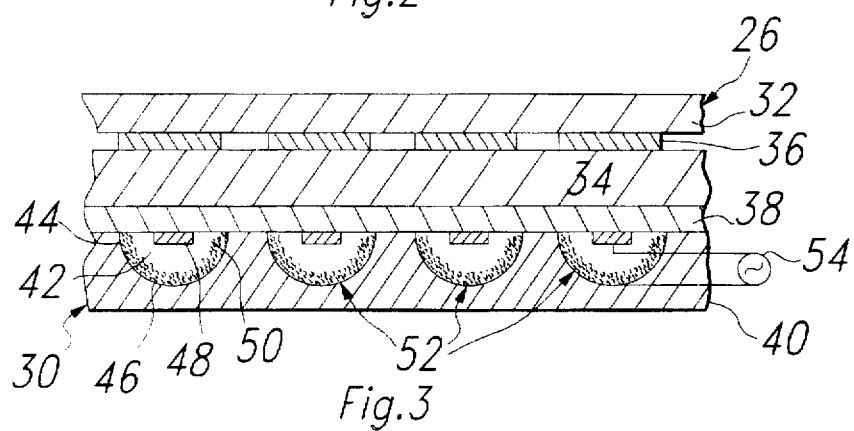
Fig.3

INTEGRATED LIQUID CRYSTAL DISPLAY AND BACKLIGHT SYSTEM FOR AN ELECTRONIC APPARATUS

TECHNICAL FIELD OF THE INVENTION

This invention relates in general to an apparatus for generating video images and, in particular to, an integrated liquid crystal display and backlight system for portable computer display applications.

BACKGROUND OF THE INVENTION

Without limiting the scope of the invention, its background is described in connection with portable computer monitors, as an example.

Heretofore, in the field, there has been an increased demand for portable computer systems such as laptop, notebook, and recently, sub-notebook computers. The portable computers have dramatically increased the mobility of computing power for the computer user. Since the first portable computer, manufacturers have increased computer mobility by decreasing the size, weight and power demands of portable computers while increasing the battery life for portable computers.

The monitors presently used for portable computer applications contribute greatly to the overall size and weight of the portable computer. Whether the monitor is monochrome display, dual scan color display, or active matrix color display, the monitor must be of a sufficient size and provide sufficient illumination so that the user has readable images. Typically, portable computer monitors have liquid crystal display systems. These systems typically include a top glass and a bottom glass having a thin film transistor and liquid crystal layer therebetween. The system drivers are typically integrated into a circuit board that surrounds the top and bottom glass. These systems also utilize a backlight system that typically includes a diffuser for passing light evenly to the liquid crystal display, a cold cathode fluorescent (CCFL) tube for producing light, a reflector for directing light toward the diffuser, and a light pipe located between the diffuser and the reflector to spread light to the entire surface of the diffuser.

The use of conventional liquid crystal display systems for portable computer applications, however, creates a limiting factor in the continuing effort to reduce the size and weight of portable computers. These complex liquid crystal display systems account for a significant part of the overall monitor thickness. Also, many backlight systems use a diffuser with a gradient which reduces light in the area closest to the CCFL tube so that the light emitted from the entire surface of the diffuser has a uniform brightness. Additional optical losses occur as light from the CCFL tube reflects off of other optical surfaces such as the reflector.

SUMMARY OF THE INVENTION

It has been discovered that the use of conventional liquid crystal display monitors in portable computer applications has created a limiting factor with regard to the size and mobility of portable computers. What is needed is an integrated liquid crystal display and backlight system for generating video images for a portable computer that is small in size, energy efficient and inexpensive to manufacture.

The present invention disclosed herein comprises a flat panel backlight for a liquid crystal display for producing video images in portable computer applications comprising a substrate having at least one cavity, an array of semispherical cavities, or a plurality of cylindrical cavities, each of the cavities having aluminized surface which has a phosphoric layer deposited thereon. A diffuser is bonded to the substrate, providing an outer boundary for the cavities such that a pocket is created. An indium tin oxide conductor layer is bonded to the diffuser and disposed within the cavities. The indium tin oxide conductor layer is electrically connected to the aluminized surface. The pockets are filled with a volume of mercury gas such that when a voltage is established between the aluminized surface and the indium tin oxide conductor layer, the phosphor becomes excited and produces light.

In one embodiment of the present invention, the indium tin oxide conductor layer is an array of indium tin oxide conductors wherein each of the indium tin oxide conductors corresponds with one of the semispherical cavities in the array of semispherical cavities. In this embodiment, reduced power consumption is achieved by independently controlling the voltage between each of the indium tin oxide conductors and the aluminized surface of the corresponding semispherical cavity.

In another embodiment of the present invention, the indium tin oxide conductor layer is a plurality of indium tin oxide strips. Each of the indium tin oxide conductor strips corresponds to one row of the semispherical cavities in the array of semispherical cavities of one cylindrical cavity in the plurality of cylindrical cavities. A reduced power mode is achieved by independently controlling the voltage between each of the indium tin oxide conductor strips and the aluminized surfaces or the corresponding row of semispherical cavities or the corresponding cylindrical cavity of the plurality of cylindrical cavities.

These and other features of the present invention will be apparent to those skilled in the art from the following detailed description of the invention taken together with the accompanying drawings.

DESCRIPTION OF THE DRAWINGS

In the drawings:

FIG. 1 is a perspective representation of a notebook computer incorporating the integrated liquid crystal display and backlight system of the present invention;

FIG. 2 is an exploded view of a notebook computer monitor incorporating the integrated liquid crystal display and backlight system of the present invention;

FIG. 3 is a cross-sectional view of one embodiment of the integrated liquid crystal display and backlight system of the present invention;

Corresponding numerals and symbols in different figures refer to corresponding parts unless otherwise indicated.

DETAILED DESCRIPTION OF THE INVENTION

Figure 4:
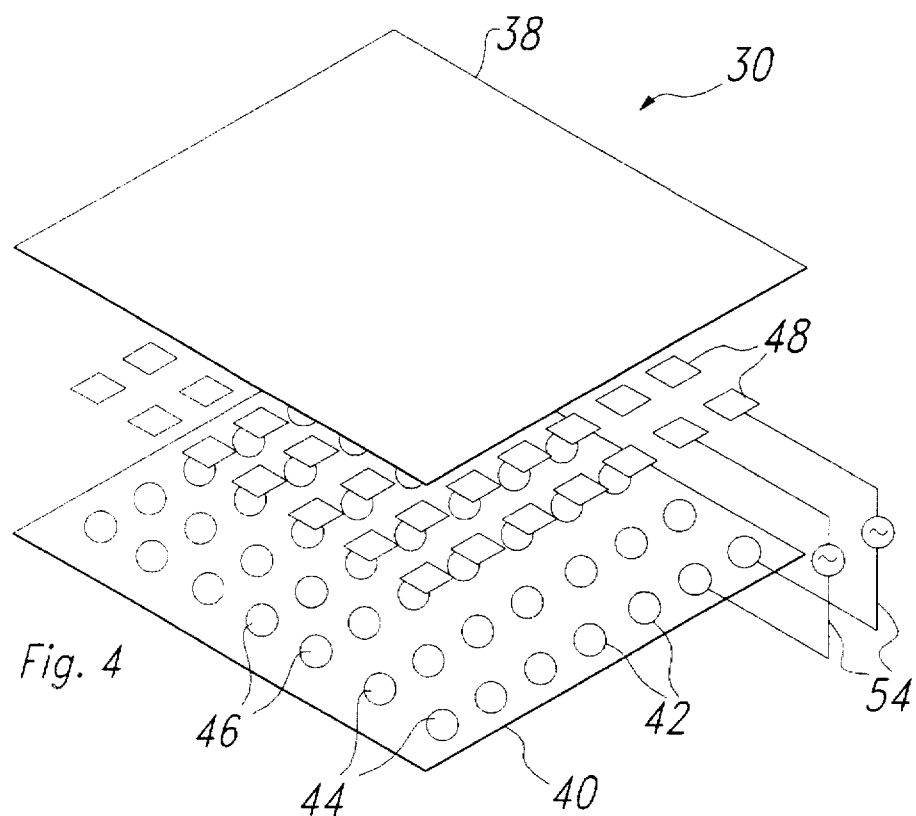
FIG. 4 is an exploded view of one embodiment of the integrated liquid crystal display and backlight system of the present invention.

The integrated liquid crystal display and backlight system of the present invention may be incorporated into a portable computer that is light weight, small in size, and energy efficient while providing suitably illuminated video images that are easy on the eyes of the user.

In FIG. 1, an integrated liquid crystal display and backlight system incorporated into a notebook computer is generally designated 10. Notebook computer 12 has a keyboard 14 and pointing device 16. Even though FIG. 1 depicts keyboard 14 and pointing devices 16 as input devices, it should be understood by one skilled in the art that a variety of input devices are equally well-suited for the present invention including, but not limited to, a mouse, a trackball, or a microphone for voice-activated software, such as Voice Assist by Creative Labs or Listen by Vertex. Monitor housing 18 of notebook computer 12 contains the integrated liquid crystal display and backlight system of the present invention. Video images generated by notebook computer 12 are viewed on screen 20.

Referring to FIG. 2, an exploded view of monitor housing 18 of FIG. 1 is depicted. Monitor housing 18 comprises front casing 22 and rear casing 24. Between front casing 22 and rear casing 24 is liquid crystal display system 26, having a plurality of liquid crystal display drivers 28 and backlight system 30.

Referring to FIG. 3, a cross-sectional view of one embodiment of the integrated liquid crystal display and backlight system of the present invention is depicted. Liquid crystal display system 26 includes top glass 32 and bottom glass 34. In between top glass 32 and bottom glass 34 is a thin film transistor and liquid crystal layer 36 that modulate or control the polarization of light traveling therethrough. In one embodiment, liquid crystal display system 26 also includes diffuser 38 which spreads light to produce uniform illumination to screen 20.

Backlight system 30 also includes polymeric substrate 40, which has a plurality of cavities 42. Cavities 42 have a concave surface which is aluminized. It should be understood that a variety of aluminizing processes are equally well-suited for the present invention including, but not limited to, chemical deposition, electrical sputtering, and vacuum forming. Aluminized surface 44 has a reflectivity in excess of ninety-five percent which minimizes optical losses and so that almost all of the light directed toward aluminized surface 44 is reflected toward diffuser 38.

Above aluminized surface 44 is phosphor layer 46. Phosphor layer 46 may be applied by a phosphor deposition process which is commonly known in the art. Backlight system 30 includes an indium tin oxide conductor layer 48 that is bonded to diffuser 38 and disposed within cavities 42. Even though FIG. 3 depicts indium tin oxide conductor layer 48 as the conductor material, it should be understood by one skilled in the art that a variety of conductor materials are equally well-suited for the present invention including, but not limited to, any transparent conductor material or non-transparent conductor materials such as gold, aluminum or copper.

A volume of mercury gas 50 fills cavities 42. Even though FIG. 3 depicts mercury gas 50 as the dischargeable gas, it should be understood by one skilled in the art that a variety of dischargeable gases are equally well-suited for the present invention including, but not limited to, neon gas or xenon gas. Each combination of aluminized surface 44, phosphor layer 46, indium tin oxide layer 48, and mercury gas 50, in cavities 42 produce a miniature CCFL tube 52. The exact number, size and shape of CCFL tubes 52 are not critical to the present so long as the light produced is uniform and sufficient to illuminate screen 20.

When a voltage 54 is established between aluminized surface 44 and indium tin oxide conductor 48, mercury gas 50 is discharged which excites phosphor 46. As phosphor 46 electrons fall from their excited state, photons of white light are emitted. Light from backlight system 30 is spread in diffuser 38 and travels through bottom glass 34, thin film transistor and liquid crystal layer 36, top glass 32, and screen 20 to provide illumination for video images viewed by the user.

FIG. 4 depicts an exploded view of one embodiment of the integrated liquid crystal display and backlight system of the present invention. Polymeric substrate 40 has a plurality of semispherical cavities 42 each having an aluminized surface with a phosphor layer 46 thereon. An array of indium tin oxide conductors 48 is above polymeric substrate 40. Even though FIG. 4 depicts indium tin oxide conductors 48 as the conductor material, it should be understood by one skilled in the art that a variety of conductor materials are equally well-suited for the present invention including, but not limited to, any transparent conductor material or non-transparent conductor materials such as gold, aluminum or copper. Above indium tin oxide conductor layer 48 is diffuser 38 for spreading light.

Each of the indium tin oxide conductors 48 corresponds with one of the semispherical cavities 42 in polymeric substrate 40. Each indium tin oxide conductor 48 is electrically connected to the aluminized surface 44 of one of the semispherical cavities 42 of polymeric substrate 40 such that voltage 54 is independently controllable between each corresponding indium tin oxide conductor 48 and semispherical cavity 42 pair.

In this embodiment, three power modes are available for backlight system 30. In standard power mode, voltage 54 is continuously provided between each indium tin oxide conductor 48 and each corresponding aluminized surface 44 to provide continuous illumination to liquid crystal display system 30. In a first low power mode, an alternate minimum and full power voltage 54 is provided serially to each row of corresponding indium tin oxide conductors 48 and aluminized surfaces 44. In this mode, for example, voltage 54 of each indium tin oxide conductor 48 and aluminized surface 44 in a horizontal row would be modulated together creating horizontal illumination. Backlight system 30 then scans down to the next horizontal row. This process provides sufficient illumination to the entire liquid crystal display system 26 by rapidly scanning each row of indium tin oxide conductors 48 and aluminized surfaces 44.

In a second low power mode, only selected pairs of indium tin oxide conductors 48 and aluminized surfaces 44 receive voltage 54. The reduced number of CCFL tubes 52 reduces the energy consumption of backlight system 30. In another embodiment of this low power mode, a selected number of CCFL tubes 52 which only produce a monochrome light such as green are energized. In this embodiment, the image viewed by the user on screen 20 is monochrome.

Figure 5:
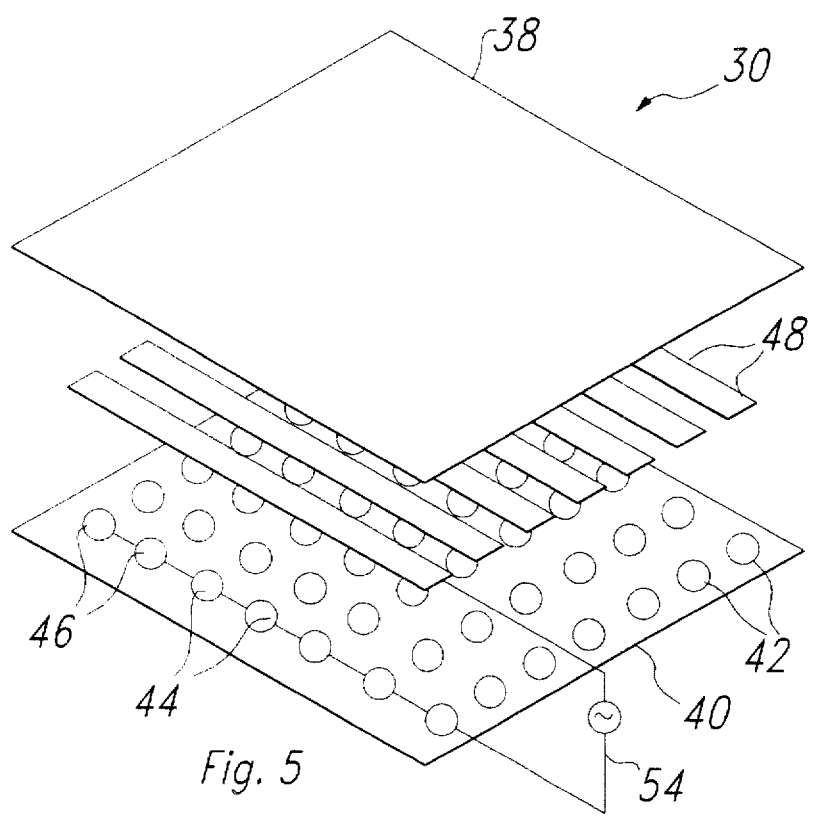
FIG. 5 is an exploded view of one embodiment of the integrated liquid crystal display and backlight system of the present invention.

In FIG. 5, another embodiment of the integrated liquid crystal display and backlight system is depicted. Polymeric substrate 40 and diffuser 38 have indium tin oxide layer 48 therebetween. Even though FIG. 5 depicts indium tin oxide conductor layer 48 as the conductor material, it should be understood by one skilled in the art that a variety of conductor materials are equally well-suited for the present invention including, but not limited to, any transparent conductor material or non-transparent conductor materials such as gold, aluminum or copper. Polymeric substrate 40 comprises a plurality of semispherical cavities 42 which have an aluminized surface 44 and a phosphor layer 46 deposited thereon. Voltage 54 is provided between indium tin oxide conductor 48 and a row of aluminized surfaces 44.

In this embodiment of the present invention, two power consumption modes are available. In standard power mode, voltage 54 is continuously provided between all indium tin oxide conductors 48 and aluminized surfaces 44. In a low power mode, because voltage is independently controllable between each indium tin oxide conductor 48 and each row of aluminized surfaces 44, each row of CCFL tubes 52 may be sequentially scanned as described in reference to FIG. 4.

Figure 6:
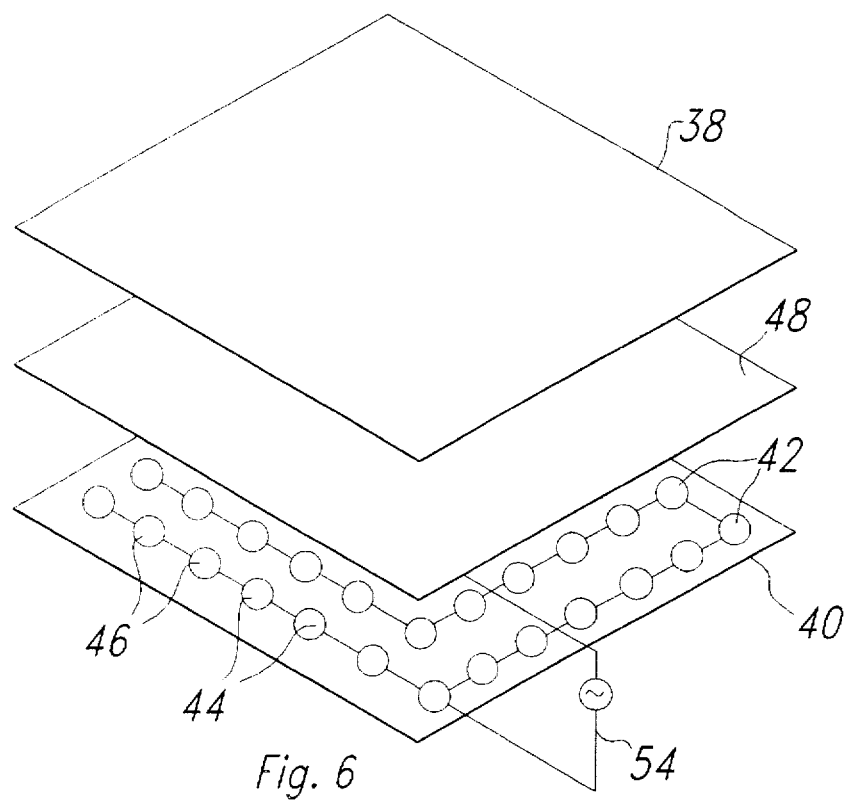
FIG. 6 is an exploded view of one embodiment of the integrated liquid crystal display and backlight system of the present invention.

One embodiment of the present invention is depicted in FIG. 6. Diffuser 38 is above indium tin oxide conductor layer 48 which, in turn, is above polymeric substrate 40. Even though FIG. 6 depicts indium tin oxide conductor layer 48 as the conductor material, it should be understood by one skilled in the art that a variety of conductor materials are equally well-suited for the present invention including, but not limited to, any transparent conductor material or non-transparent conductor materials such as gold, aluminum or copper. Polymeric substrate 40 includes an array of semi-spherical cavities 42 which have an aluminized surface 44 and a phosphor layer 46 deposited thereon. Each of the aluminized surfaces 44 is electrically connected to indium tin oxide conductor layer 48. When voltage 54 is provided between indium tin oxide layer 48 and the array of aluminized surfaces 44, each of the CCFL tubes 52 produces light.

Figure 7:
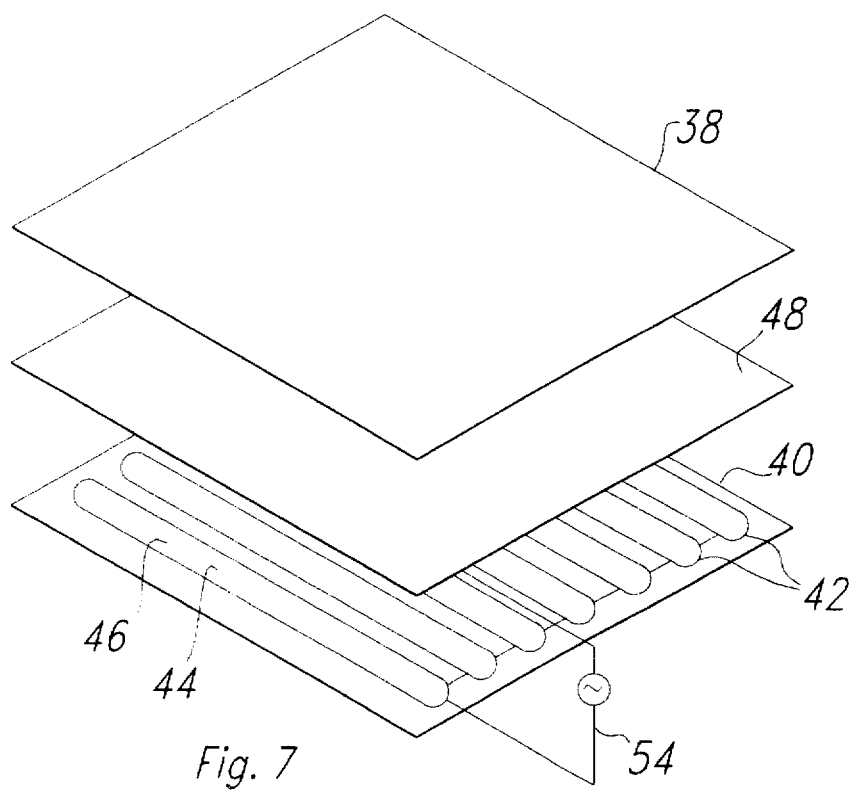
FIG. 7 is an exploded view of one embodiment of the integrated liquid crystal display and backlight system of the present invention.

In FIG. 7, an additional embodiment of the present invention is depicted. Polymeric substrate 40 and diffuser 38 have indium tin oxide conductor layer 48 therebetween. Even though FIG. 7 depicts indium tin oxide conductor layer 48 as the conductor material, it should be understood by one skilled in the art that a variety of conductor materials are equally well-suited for the present invention including, but not limited to, any transparent conductor material or non-transparent conductor materials such as gold, aluminum or copper. Polymeric substrate 40 has a plurality of cylindrical cavities 42, each having an aluminized surface 44 and a phosphor layer 46 thereon.

In one embodiment, aluminized surfaces 44 are electrically connected to one another and electrically connected to indium tin oxide conductor layer 48. When a voltage 54 is provided between indium tin oxide conductor layer 48 and the plurality of cylindrical cavities having aluminized surfaces 44, light is generated for liquid crystal display system 26.

In another embodiment, indium tin oxide conductor layer 48 comprises a plurality of indium tin oxide conductor strips 48 as shown in reference to FIG. 5. In this embodiment, each indium tin oxide conductor strip 48 is electrically connected with one cylindrical cavity 42, having aluminized surface 44, such that voltage 54 is independently controllable between each indium tin oxide conductor strip 48 and each aluminized surface 44. This configuration provides a low power mode in which each indium tin oxide conductor strip 48 and each aluminized surface 44 may be sequentially scanned as described in reference to FIG. 4.

Figure 8:
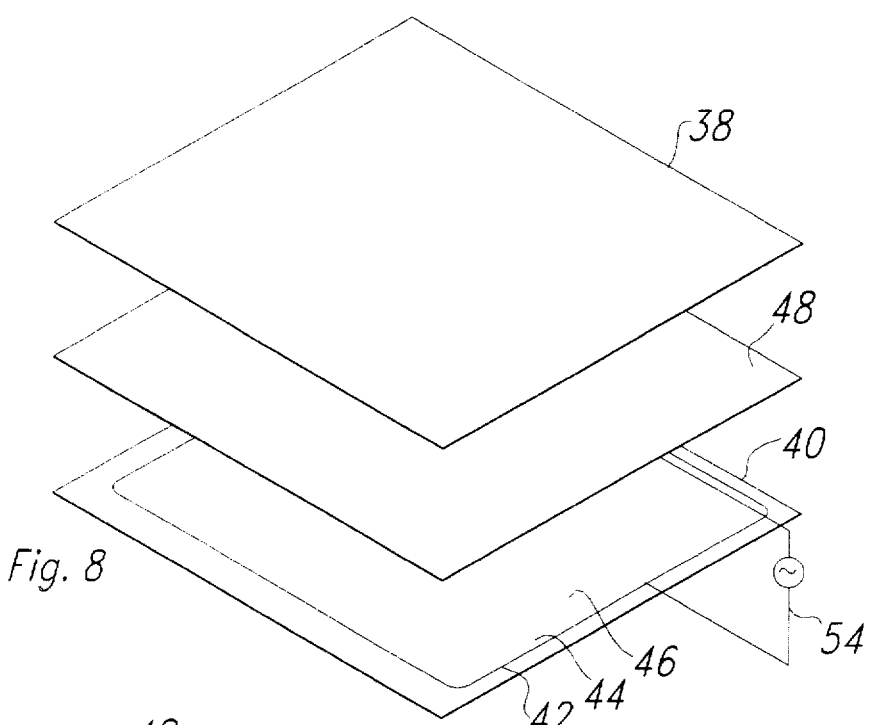
FIG. 8 is an exploded view of one embodiment of the integrated liquid crystal display and backlight system of the present invention.

FIG. 8 depicts an exploded view of one embodiment of the integrated liquid crystal display and backlight system of the present invention. Diffuser 38 is disposed above indium tin oxide conductor layer 48 which, in turn, is disposed above polymeric substrate 40. Even though FIG. 8 depicts indium tin oxide conductor layer 48 as the conductor material, it should be understood by one skilled in the art that a variety of conductor materials are equally well-suited for the present invention including, but not limited to, any transparent conductor material or non-transparent conductor materials such as gold, aluminum or copper. Polymeric substrate 40 has a single cavity 42, which has an aluminized surface 44 and a phosphor layer 46 deposited thereon. When voltage 54 is provided between indium tin oxide conductor layer 48 and aluminized surface 44, a single flat panel CCFL tube 52 provides light for liquid crystal display system 26.

Figure 9:
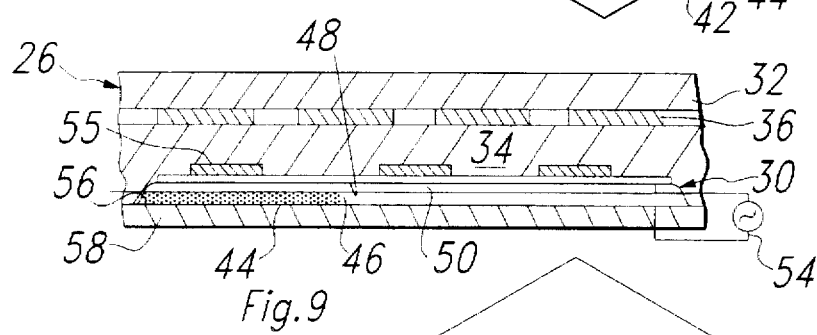
FIG. 9 is a cross-sectional view of one embodiment of the integrated liquid crystal display and backlight system of the present invention.

FIG. 9 is a cross-sectional view of one embodiment of the integrated liquid crystal display and backlight system of the present invention. Liquid crystal display system 26 includes top glass 32, thin film transistor and liquid crystal layer 36 and bottom glass 34. Bottom glass 34 includes backlight system 30. Bottom glass 34 has a cavity 56 on the side opposite top glass 32. On the upper surface of cavity 56 is indium tin oxide conductor layer 48. Even though FIG. 9 depicts indium tin oxide conductor layer 48 as the conductor material, it should be understood by one skilled in the art that a variety of conductor materials are equally well-suited for the present invention including, but not limited to, any transparent conductor material or non-transparent conductor materials such as gold, aluminum or copper. Bottom glass 34 has a plurality of fresnel lens 55 etched on the side opposite top glass 32.

Cover panel 58 is bonded to bottom glass 34 providing a lower seal for cavity 56. Cover panel 58 has an aluminized surface 44 which has a phosphor layer 46 deposited thereon. Mercury gas 50 fills cavity 56. When voltage 54 is provided between aluminized surface 44 and indium tin oxide conductor layer 48, mercury 50 is discharged which excites phosphor 46. When phosphor 46 electrons fall out of the excited state, photons of light are produced which illuminate liquid crystal display system 26 and screen 20. Even though FIG. 9 depicts mercury gas 50 as the dischargeable gas, it should be understood by one skilled in the art that a variety of dischargeable gases are equally well-suited for the present invention including, but not limited to, neon gas or xenon gas.

Figure 10:
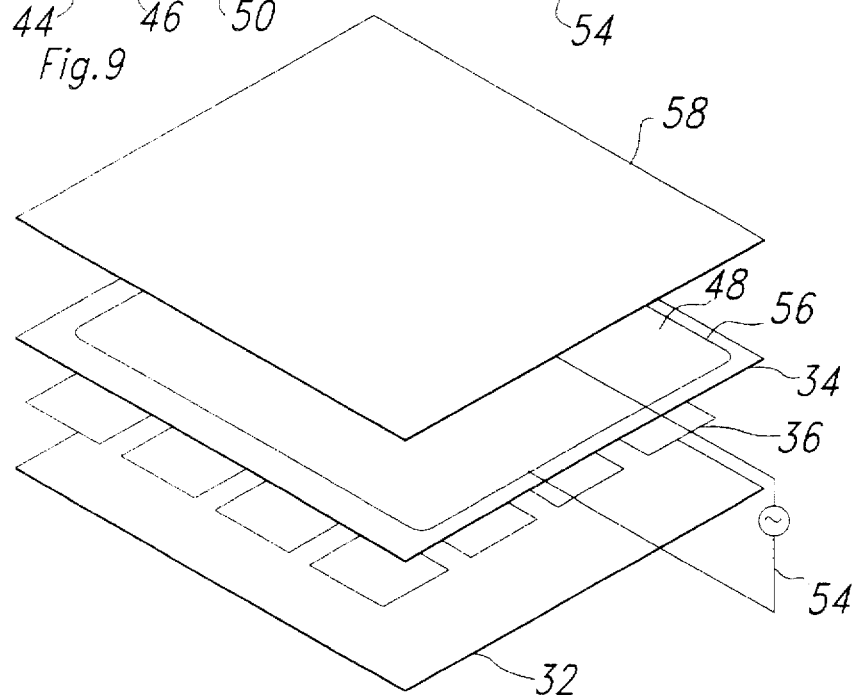
FIG. 10 is an exploded view of one embodiment of the liquid crystal display and backlight system of the present invention.

FIG. 10 depicts an exploded view of the integrated liquid crystal display and backlight system of FIG. 9. Top glass 32 and bottom glass 34 have thin film transistor and liquid crystal layer 36 therebetween. Cover panel 58 is above bottom glass 34. Bottom glass 34 includes cavity 56 which has indium tin oxide layer 48 bonded thereon. Even though FIG. 10 depicts indium tin oxide conductor layer 48 as the conductor material, it should be understood by one skilled in the art that a variety of conductor materials are equally well-suited for the present invention including, but not limited to, any transparent conductor material or non-transparent conductor materials such as gold, aluminum or copper. Cover panel 58 has an aluminized surface, having a phosphor layer deposited thereon (not pictured). When voltage 54 is provided between the aluminized surface on cover panel 58 and indium tin oxide conductor layer 48, flat panel CCFL tube 52 produces light.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. An integrated liquid crystal display and backlight system for a portable computer comprising:
    a liquid crystal display;
    a flat panel backlight disposed in parallel with said liquid crystal liquid crystal display, said flat panel backlight further comprising:
        a diffuser bonded to said liquid crystal display;
        a substrate having an array of semispherical cavities bonded to said diffuser opposite said liquid crystal display;
        an aluminized surface coating said semispherical cavities;
        a phosphor layer coating said aluminized surface;
        a conductor layer electrically connected to said aluminized surface and disposed within said cavities; and
        a volume of dischargeable gas filling said cavity such that when a voltage is established between said aluminized surface and said conductor layer said phosphor becomes excited and produces backlight for said liquid crystal display system.

2. The integrated liquid crystal display and backlight system as recited in claim 1 wherein said conductor layer further includes an array of conductors, each of said conductors corresponding to one of said semispherical cavities in said array of semispherical cavities.

3. The integrated liquid crystal display and backlight system as recited in claim 2 wherein said voltage between each of said conductors and said aluminized surfaces of said corresponding semispherical cavities is independently controllable.

4. The integrated liquid crystal display and backlight system as recited in claim 1 wherein said conductor layer further includes a plurality of conductor strips, each of said conductor strip corresponding to one row of said semispherical cavities in said array of semispherical cavities.

5. The integrated liquid crystal display and backlight system as recited in claim 4 wherein said voltage between each of said conductor strips and said aluminized surfaces of said corresponding row of semispherical cavities is independently controllable.

6. An integrated liquid crystal display and backlight system for a portable computer comprising:
    a liquid crystal display;
    a flat panel backlight disposed in parallel with said liquid crystal liquid crystal display, said flat panel backlight further comprising:
        a diffuser bonded to said liquid crystal display;
        a substrate having a plurality of cylindrical cavities bonded to said diffuser opposite said liquid crystal display;
        an aluminized surface coating said plurality of cylindrical cavities;
        a phosphor layer coating said aluminized surface;
        a plurality of conductor strips, each of said conductor strips corresponding to one cylindrical cavity of said plurality of cylindrical cavities, each conductor strip electrically connected to said aluminized surface and disposed within a respective cavity; and
        a volume of dischargeable gas filling said cavity such that when a voltage is established between said aluminized surface and one of said conductor strips, said phosphor becomes excited and produces backlight for said liquid crystal display system.

7. The integrated liquid crystal display and backlight system as recited in claim 6 wherein said voltage between each of said conductor strips and said aluminized surface of said corresponding cylindrical cavity is independently controllable.

8. An integrated liquid crystal display and backlight system for a portable computer comprising:
    a liquid crystal display including a top glass and a bottom glass having a cavity on the side opposite said top glass; and
    a flat panel backlight disposed in parallel with said liquid crystal display, said flat panel backlight further including:
        a cover bonded to said bottom glass opposite said top glass providing a seal;
        an aluminized surface coating said cover;
        a phosphor layer coating said aluminized surface;
        a conductor layer electrically connected to said aluminized surface and disposed within said cavity;
        a volume of dischargeable gas filling said cavity such that when a voltage is established between said aluminized surface and said conductor layer said phosphor becomes excited and produces backlight for said liquid crystal display system; and
        at least one fresnel lens etched on said bottom glass in said cavity.

9. A flat panel backlight for a liquid crystal display comprising:
    a substrate having an array of semispherical cavities;
    an aluminized surface coating said semispherical cavities;
    a cover bonded to said substrate providing a boundary for said semishperical cavities;
    a phosphor layer disposed within said cavities;
    a conductor layer electrically connected to said aluminized surface and disposed within said cavities; and
    a volume of dischargeable gas filling said cavity such that when a voltage is established between said aluminized surface and said conductor layer said phosphor becomes excited and produces light.

10. The flat panel backlight as recited in claim 9 wherein said conductor layer further includes an array of conductors, each of said conductors corresponding to one of said semispherical cavities in said array of semispherical cavities.

11. The flat panel backlight as recited in claim 10 wherein said voltage between each of said conductors and said aluminized surfaces of said corresponding semispherical cavities is independently controllable.

12. The flat panel backlight as recited in claim 9 wherein said conductor layer further includes a plurality of conductor strips, each of said conductor strip corresponding to one row of said semispherical cavities in said array of semispherical cavities.

13. The flat panel backlight as recited in claim 12 wherein said voltage between each of said conductor strips and said aluminized surfaces of said corresponding row of semispherical cavities is independently controllable.

14. The flat panel backlight as recited in claim 9 wherein said cover is a diffuser.

15. A flat panel backlight for a liquid crystal display comprising:
    a substrate having a plurality of cylindrical cavities;
    an aluminized surface coating said cylindrical cavities;
    a cover bonded to said substrate providing a boundary for said cylindrical cavities;
    a phosphor layer disposed within said cavities;

a plurality of conductor strips, each of said conductor strips corresponding to one cylindrical cavity of said plurality of cylindrical cavities, each conductor strip electrically connected to said aluminized surface and disposed within a respective cavity; and a volume of dischargeable gas filling said cavity such that when a voltage is established between said aluminized surface and said conductor layer said phosphor becomes excited and produces light.

16. The flat panel backlight as recited in claim 15 wherein said voltage between each of said conductor strips and said aluminized surface of said corresponding cylindrical cavity is independently controllable.

17. A method for generating backlight for a liquid crystal display comprising:

providing a flat panel substrate;

forming an array of spherical cavities in said flat panel substrate;

aluminizing the surface of said cavities;

coating said aluminized surface with phosphor;

bonding a conductor to a diffuser;

filling said cavities with a dischargeable gas; and bonding said diffuser to said flat panel substrate.

18. The method for generating backlight as recited in claim 17 further including the steps of:

applying a voltage between said aluminized surface and said conductor;

discharging said dischargeable gas;

exciting said phosphor; and generating said backlight.

19. A method for generating backlight for a liquid crystal display comprising:

providing a liquid crystal display having a top glass, a bottom glass disposed in parallel with said top glass and a thin film transistor and liquid crystal layer between said top glass and said bottom glass;

forming a cavity in said bottom glass on the side opposite said top glass;

etching at least one fresnel lens on said bottom glass in said cavity;

attaching a cover to said bottom glass on the side opposite said top glass;

aluminizing the surface of said cover;

coating said aluminized surface with phosphor;

bonding a conductor or layer to said bottom glass within said cavity; and filling said cavity with a dischargeable gas.

20. The method for generating backlight as recited in claim 19 further including the steps of:

applying a voltage between said aluminized surface and said conductor;

discharging said dischargeable gas;

exciting said phosphor; and generating said backlight.

21. A monitor for an electronic apparatus, comprising:

a liquid crystal display;

a flat panel backlight disposed in parallel with said liquid crystal liquid crystal display, said flat panel backlight further comprising:

a diffuser bonded to said liquid crystal display;

a substrate having a plurality of semispherical cavities bonded to said diffuser opposite said liquid crystal display;

an electrically conductive surface coating said semispherical cavities;

a phosphor layer coating said electrically conductive surface;

a conductor layer electrically connectable to said electrically conductive surface and disposed within said cavities; and a volume of dischargeable gas filling said cavity such that when a voltage is established between said electrically conductive surface and said conductor layer said phosphor becomes excited and produces backlight for said liquid crystal display system.

22. The monitor of claim 21 wherein said plurality of semispherical cavities are oriented in an array of semispherical cavities.

23. The monitor of claim 21 wherein said electrically conductive surface is formed of one of gold, aluminum or copper.

24. The monitor of claim 21 wherein said electrically conductive surface is further light reflective.

25. The monitor of claim 21 wherein said electrically conductive surface is transparent.

26. A monitor for an electronic apparatus, comprising:

a liquid crystal display;

a flat panel backlight disposed in parallel with said liquid crystal liquid crystal display, said flat panel backlight further comprising:

a diffuser bonded to said liquid crystal display;

a substrate having a plurality of cylindrical cavities bonded to said diffuser opposite said liquid crystal display;

an electrically conductive surface coating said plurality of cylindrical cavities;

a phosphor layer coating said electrically conductive surface;

a plurality of conductor strips, each of said conductor strips corresponding to one cylindrical cavity of said plurality of cylindrical cavities, each conductor strip electrically connectable to said electrically conductive surface and disposed within a respective cavity; and a volume of dischargeable gas filling said cavity such that when a voltage is established between said aluminized surface and one of said conductor strips, said phosphor becomes excited and produces backlight for said liquid crystal display system.

27. The monitor of claim 26 wherein said electrically conductive surface is formed of one of gold, aluminum or copper.

28. The monitor of claim 26 wherein said electrically conductive surface is further light reflective.

29. The monitor of claim 26 wherein said electrically conductive surface is transparent.

* * * * *